United States Patent
Martensson

Patent Number: 5,923,146
Date of Patent: Jul. 13, 1999

[54] BATTERY CHARGING UNIT INCORPORATED IN A POWER CORD REEL HOUSING

[75] Inventor: Nils Martensson, Chobham, United Kingdom

[73] Assignee: IPR Industries, Ltd., Farnborough, United Kingdom

[21] Appl. No.: 08/946,664

[22] Filed: Oct. 7, 1997

[30] Foreign Application Priority Data

Oct. 30, 1996 [GB] United Kingdom ............... 9622585

[51] Int. Cl.$^6$ ................. H02J 7/00; H02M 1/00
[52] U.S. Cl. ............ 320/111; 320/113; 363/146
[58] Field of Search .................. 320/105, 107, 320/112, 113, 111; 363/144, 146

[56] References Cited

U.S. PATENT DOCUMENTS

| | | | |
|---|---|---|---|
| 3,621,869 | 11/1971 | Albarran | 137/234.6 |
| 3,815,078 | 6/1974 | Fedrick | |
| 4,079,304 | 3/1978 | Brandenburg | 320/105 |
| 4,108,264 | 8/1978 | Tanaka | 180/2 R |
| 4,215,306 | 7/1980 | Mace | 320/105 |
| 4,389,608 | 6/1983 | Dahl et al. | 320/137 |
| 4,466,581 | 8/1984 | Hill | |
| 4,489,223 | 12/1984 | Puckett et al. | 191/12.2 R |
| 4,893,037 | 1/1990 | Schwartz | 310/68 R |
| 5,358,461 | 10/1994 | Bailey, Jr. | 482/2 |
| 5,367,243 | 11/1994 | Wells et al. | 320/105 |

FOREIGN PATENT DOCUMENTS

| | | |
|---|---|---|
| 0 692 849 A1 | 1/1996 | European Pat. Off. |
| 0 716 495 A2 | 6/1996 | European Pat. Off. |
| 1165608 | 10/1969 | United Kingdom |
| 2 095 209 | 9/1982 | United Kingdom |
| 2 158 308 | 11/1985 | United Kingdom |

*Primary Examiner*—Peter S. Wong
*Assistant Examiner*—Gregory J. Toatley, Jr.
*Attorney, Agent, or Firm*—Oliff & Berridge, PLC

[57] ABSTRACT

The present invention relates to a battery charging unit comprising a housing having a current supply means provided therein for supplying current to an electrical or electronic apparatus located remote from the battery charging unit, coupling means provided on the housing for coupling the current supply means to a mains power supply, means for coupling the remote apparatus to the current supply means, comprising a cable, and a reel provided in the housing for storing the cable in the housing when the battery charging unit is not in use, and allowing the cable to be dispensed when required. This has the advantage that by having a device around which the cable remains wound during storage and from which the cable is simply unwound from the charging unit when it is required eliminates the unsightly and messy bunching of the cable which is a feature of known charging units.

18 Claims, 11 Drawing Sheets

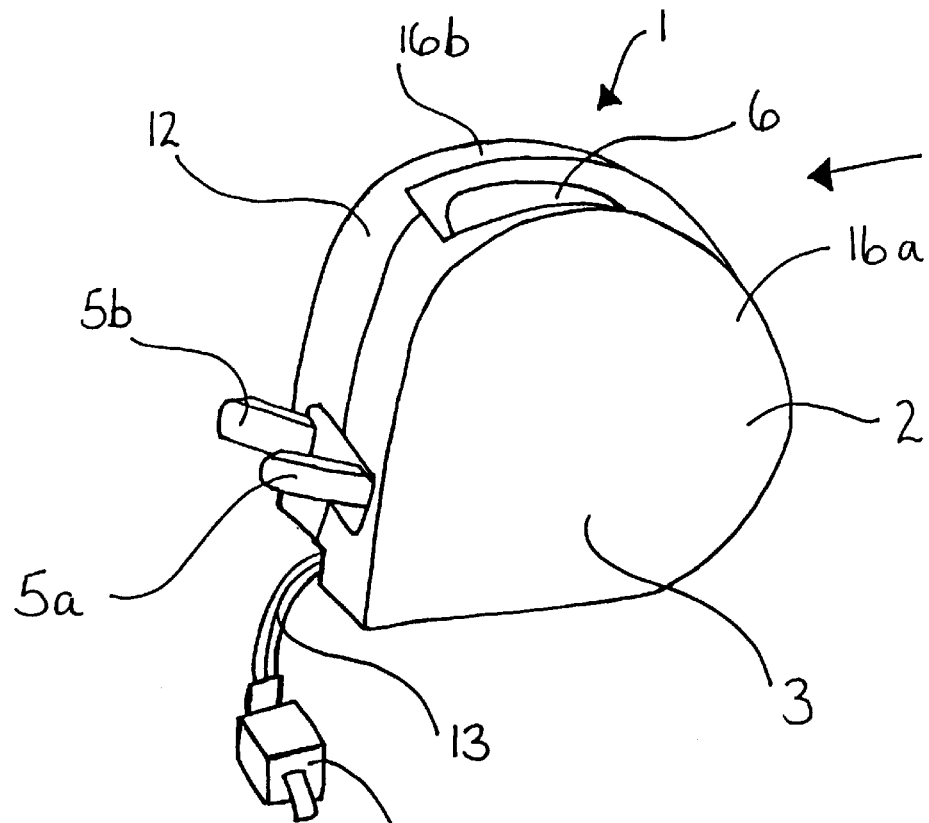
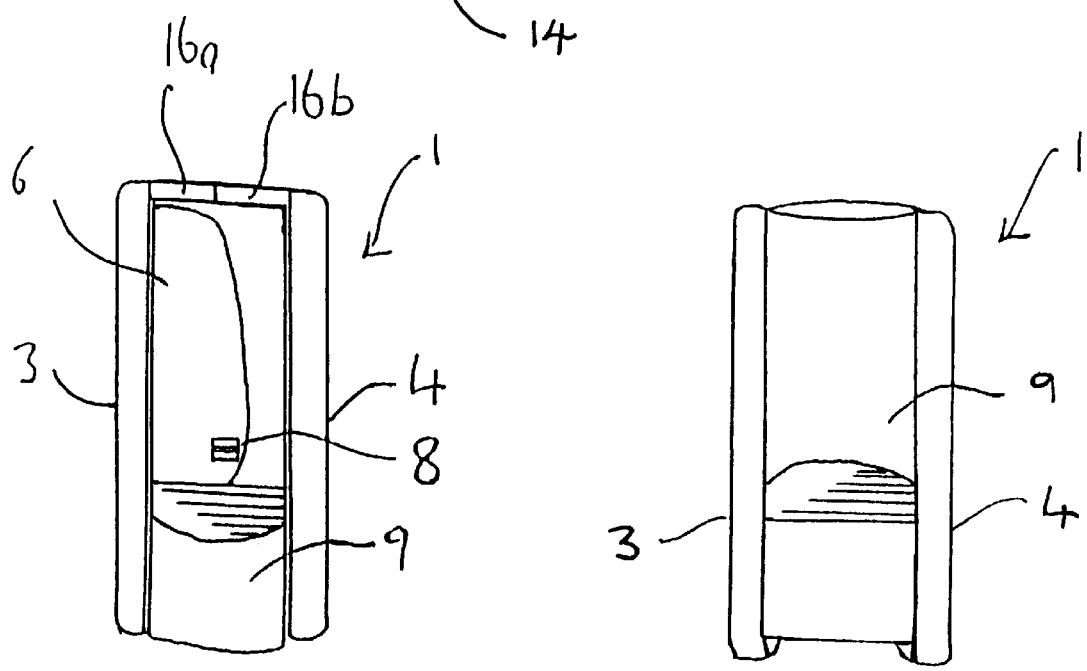
Fig. 1
Fig. 2a          Fig. 2b

BATTERY CHARGING UNIT INCORPORATED IN A POWER CORD REEL HOUSING

BACKGROUND OF THE INVENTION

The present invention relates to a battery charging unit for an electrical or electronic device, particularly, although not exclusively, for a cellular radio telephone.

Commonly, portable cellular radio telephones are provided with removable batteries as their current source. Typically, these batteries are Nickel-Cadmium (Ni—Cd) batteries which are rechargeable.

To recharge the battery, the battery is left attached to the cellular radio telephone, and is recharged "in situ" by means of a charging unit. The charging unit is coupled to a mains alternating current (AC) supply via a conventional plug arrangement (in the United Kingdom, this is a 3-pin arrangement well known to persons skilled in the art), and is coupled to the battery via a multi-conductor cable to the telephone and through internal circuitry, to the battery to be recharged. Respective matching contacts are provided, on the casing of the telephone and in a plug terminating the free end of the cable, to couple current to the telephone and battery. The charger, typically, may be a simple transformer/constant current generator or switch mode power supply, as is well known to persons skilled in the art. The telephone may be provided with control logic and means to sense one or more parameters, for example battery temperature, these being indicative of the charge state of the battery. By monitoring such parameters, one is able to ensure that the battery is optimally recharged. With this method of recharging, the battery is "fast-charged", that is where a constant current of, for example, 600 –1000 mA is supplied to the battery to effect recharging. The telephone can still be used whilst the battery is being recharged.

A problem with storing these chargers is that the cable becomes entangled with other objects and is difficult to store. The user usually has to somehow wrap the cable - usually around the main body of the charging unit which can make it bulky. Commonly, during storage, this cable comes unwrapped and tangled, which can be fiddly and time consuming to untangle.

Among the many accessories available for portable cellular radio telephones, are so-called "travel chargers". These take the form of a charging unit incorporating a transformer/constant current generator, with a pin arrangement for coupling it to the mains supply. The casing for the charging unit is provided with a recess for receiving a spare battery. Contacts are provided within the recess for contacting matching contacts on the battery. A "trickle" current is supplied to the battery when the charging unit is coupled to the mains supply, thereby slow charging the battery received therein. The charging unit does not incorporate control logic for controlling fast charging, and therefore, is only capable of slow-charging a spare battery. This takes some time. There is the problem, therefore, that should the battery currently being used as the power supply for the telephone become discharged before the spare battery is recharged, then the telephone is out of operation. Unfortunately, when the recess may be perfectly located when using a wall mounted socket, should a floor mounted socket or any type of horizontally arranged socket be used, the recess may then be at such an angle that the battery will not stay in the recess or, if it does, does not make contact with the contacts properly, making charging impossible.

According to the present invention, there is provided a battery charging unit comprising a housing having a current supply means provided therein for supplying current to an electrical or electronic apparatus located remote from the battery charging unit, coupling means provided on the housing for coupling the current supply means to a mains power supply, means for coupling the remote apparatus to the current supply means, comprising a cable, and a reel provided in the housing for storing the cable in the housing when the battery charging unit is not in use, and allowing the cable to be dispensed when required. This has the advantage that by having a device around which the cable remains wound during storage and from which the cable is simply unwound from the charging unit when it is required eliminates the unsightly and messy bunching of the cable which is a feature of known charging units.

Preferably, the reel of the charging unit is not rotatable, and may be mounted within the casing and able to be pulled out of the casing to enable the user to manually wind the cable around the reel. Preferably the outside reel face comprises an opening means by which the user can grip the reel and pull it out of the casing when it is desired to wind or unwind the cable around the reel. Preferably, all of the cable or a part of the cable may be unwound, according to a user's requirements, and the casing may be closed when the desired amount of cable is unwound. Preferably the cable may exit the casing through an aperture in the casing.

Preferably the reel includes a spindle which is mounted in a spindle housing in which the spindle can be telescopically moved and at the same time maintained in the central position with respect to the casing. The spindle and the spindle housing preferably comprise corresponding stop means to stop further movement of the reel and a cammed detent means to resiliently retain the reel in the pulled out position. The detent means will provide sufficient retaining force on the reel so that the user has his hands free to hold the casing with one hand and wind or unwind the cable around the reel with the other without inadvertently pushing the reel back in the casing and yet low enough that when the winding operation is complete the user may press the reel back in the casing with sufficient force to overcome the cammed detent means.

Preferably, the battery charging unit comprises a releasably attachable cover, which is detachable by a user to reveal a non-rotatable reel enclosed by the casing. Preferably cover attaching means are provided, and preferably the cover attaching means comprise a snap-fit attaching means. The cover attaching means may comprise a locking means such as a press-release locking means. Preferably, the transformer/current generator components of the battery charging unit are arranged under the reel.

Alternatively, the cover may be permanently attached to said battery charging unit by means of a hinge, and the cover is openable by a user to reveal the reel thereunder.

Alternatively, the cover may be permanently attached to said battery charging unit, and slidable between a closed position and an open position in which the cover is moved and the reel is revealed thereunder. Preferably a plug at the free end of the cable fits under the closed cover when the battery charging unit is not in use. An aperture may be provided in the cover, through which the cable exits the battery charging unit. Preferably, the cover is provided with locking means to retain the cover in the closed position when the battery charging unit is not in use, and finger grips which are pressed inwards by a user to disengage said locking means.

BRIEF DESCRIPTION OF THE DRAWINGS

The invention will now be described, by example only, with reference to the accompanying figures, of which:

FIG. 1 is a perspective view of a charging unit of the present invention;

FIGS. 2a and 2b are views of a first portion of the side wall of the unit of FIG. 1 illustrating, in FIG. 2a the battery receiving recess uncovered, and, in FIG. 2b the battery receiving recess covered;

DETAILED DESCRIPTION OF PREFERRED EMBODIMENTS

Figure 3:
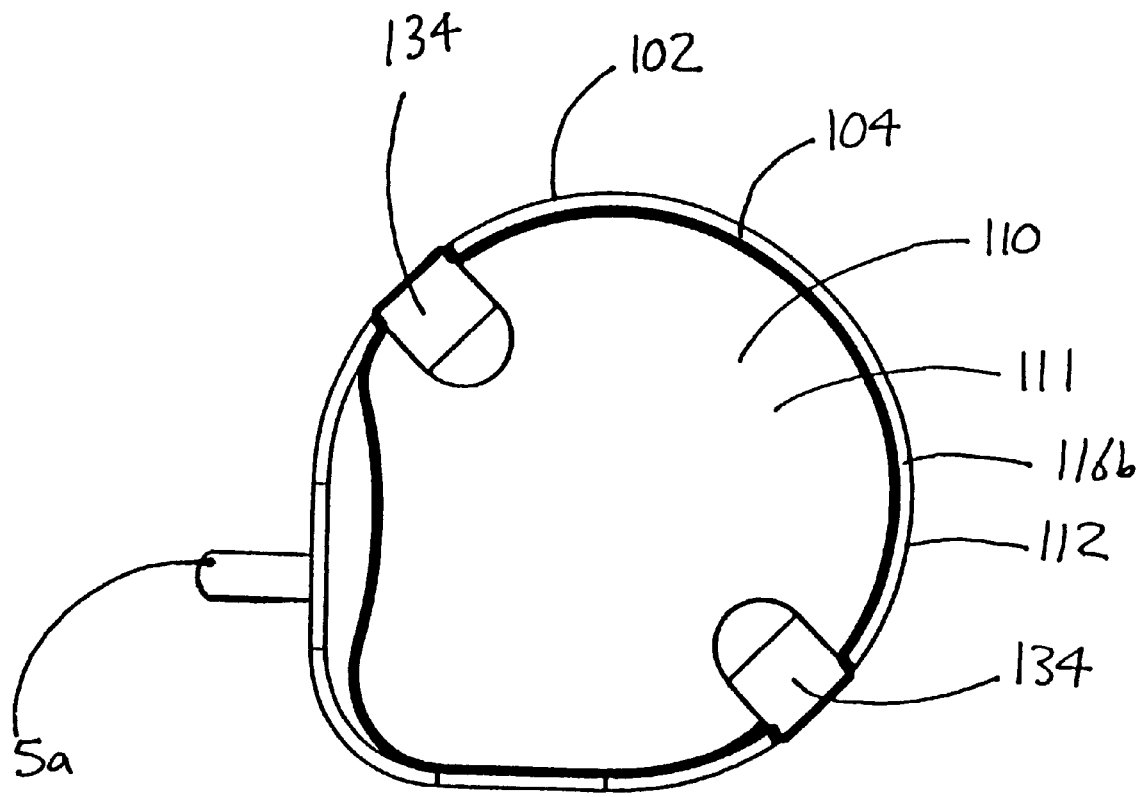
FIG. 3 is a rear view of a preferred embodiment of a battery charging unit according to the present invention.
Figure 4A:
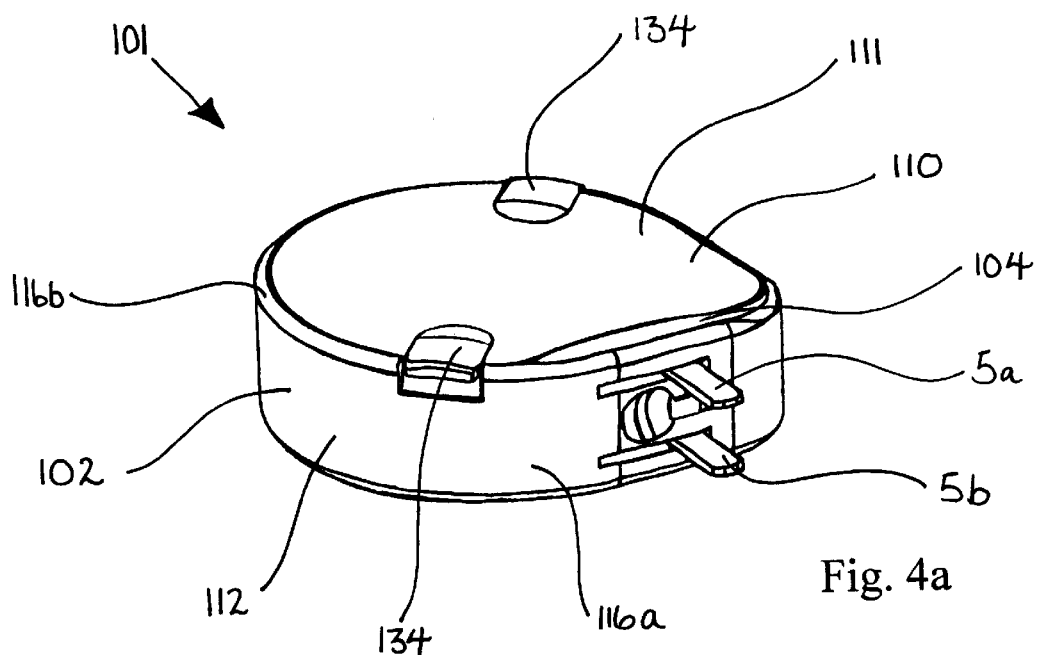
FIG. 4a is a perspective view of the embodiment of FIG. 3 in the closed position.
Figure 4B:
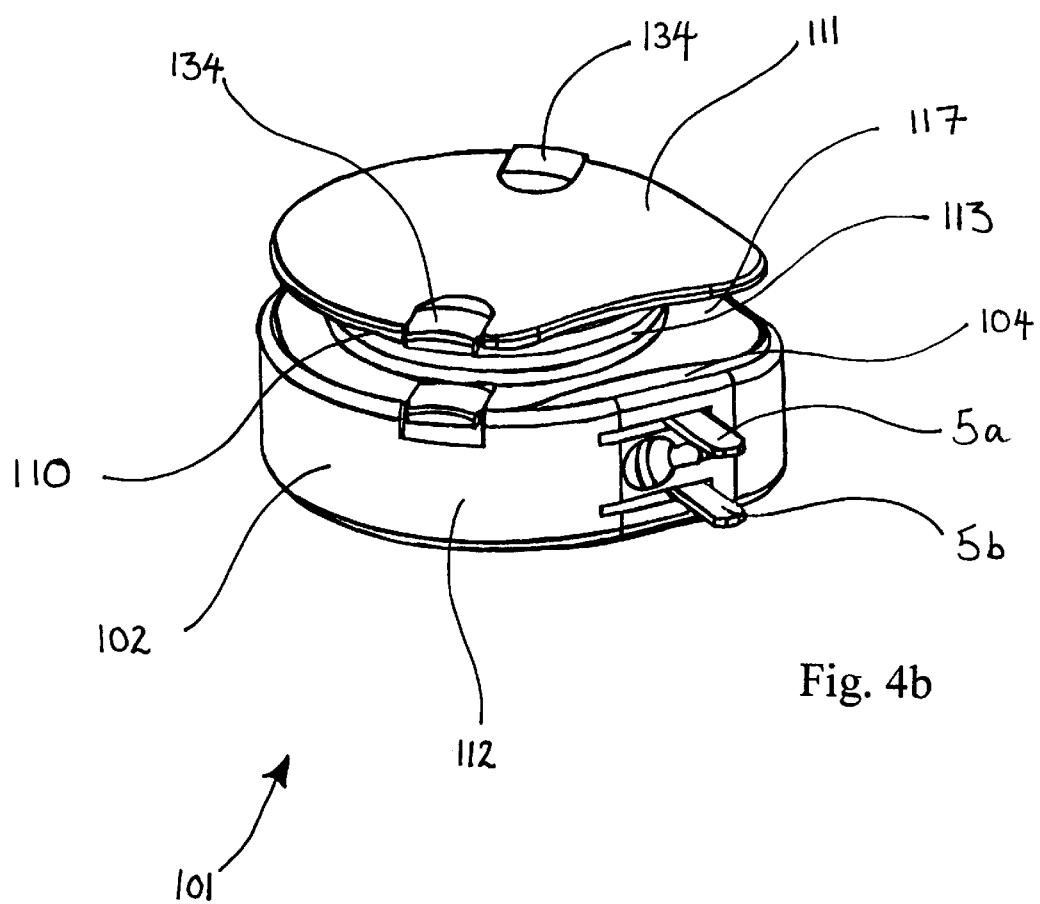
FIG. 4b is a perspective view of the embodiment of FIG. 3 in the open position.
Figure 5A:
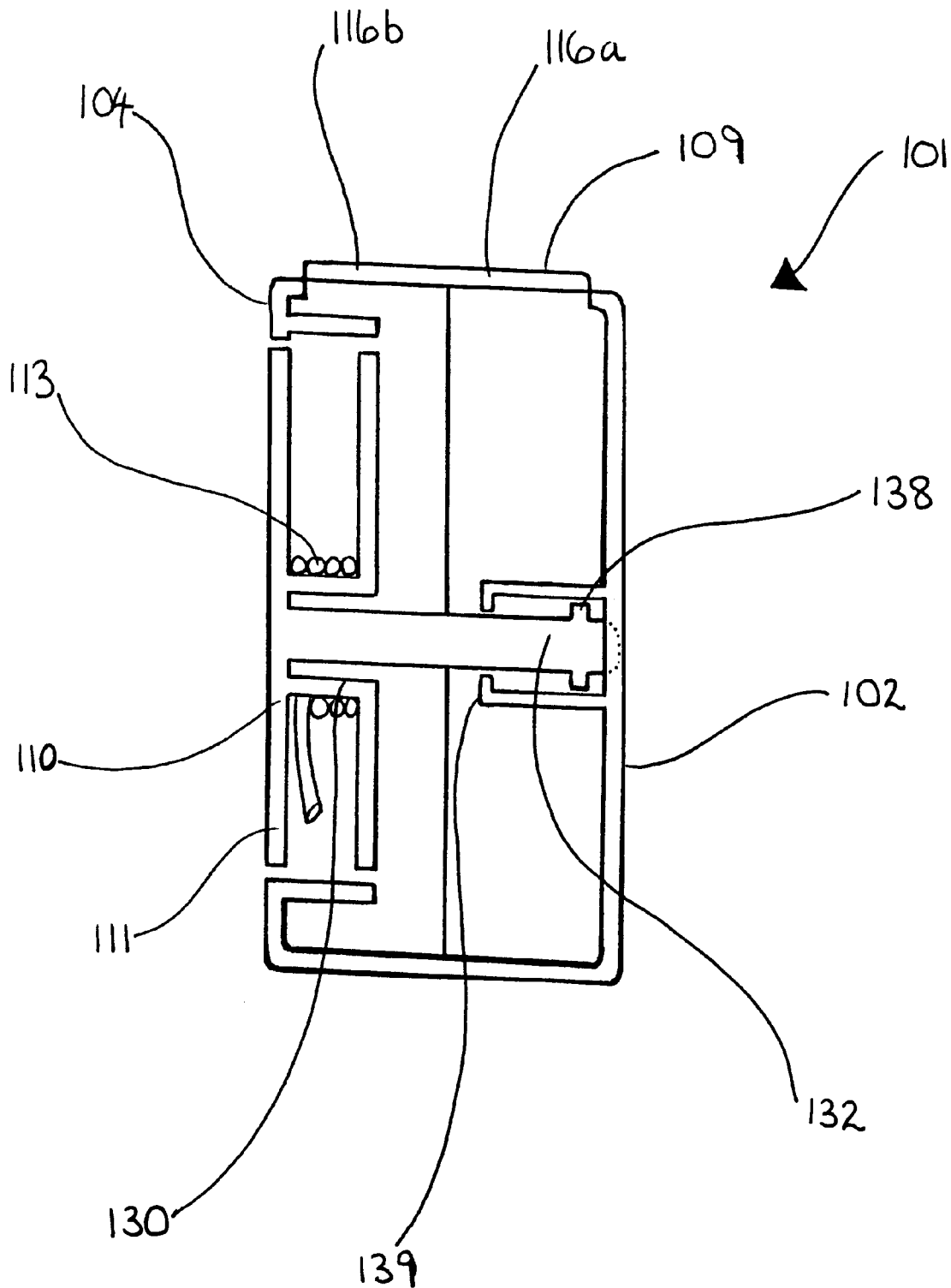
FIG. 5a is a sectional view from the side of a further embodiment of a battery charging unit in the closed position.
Figure 5B:
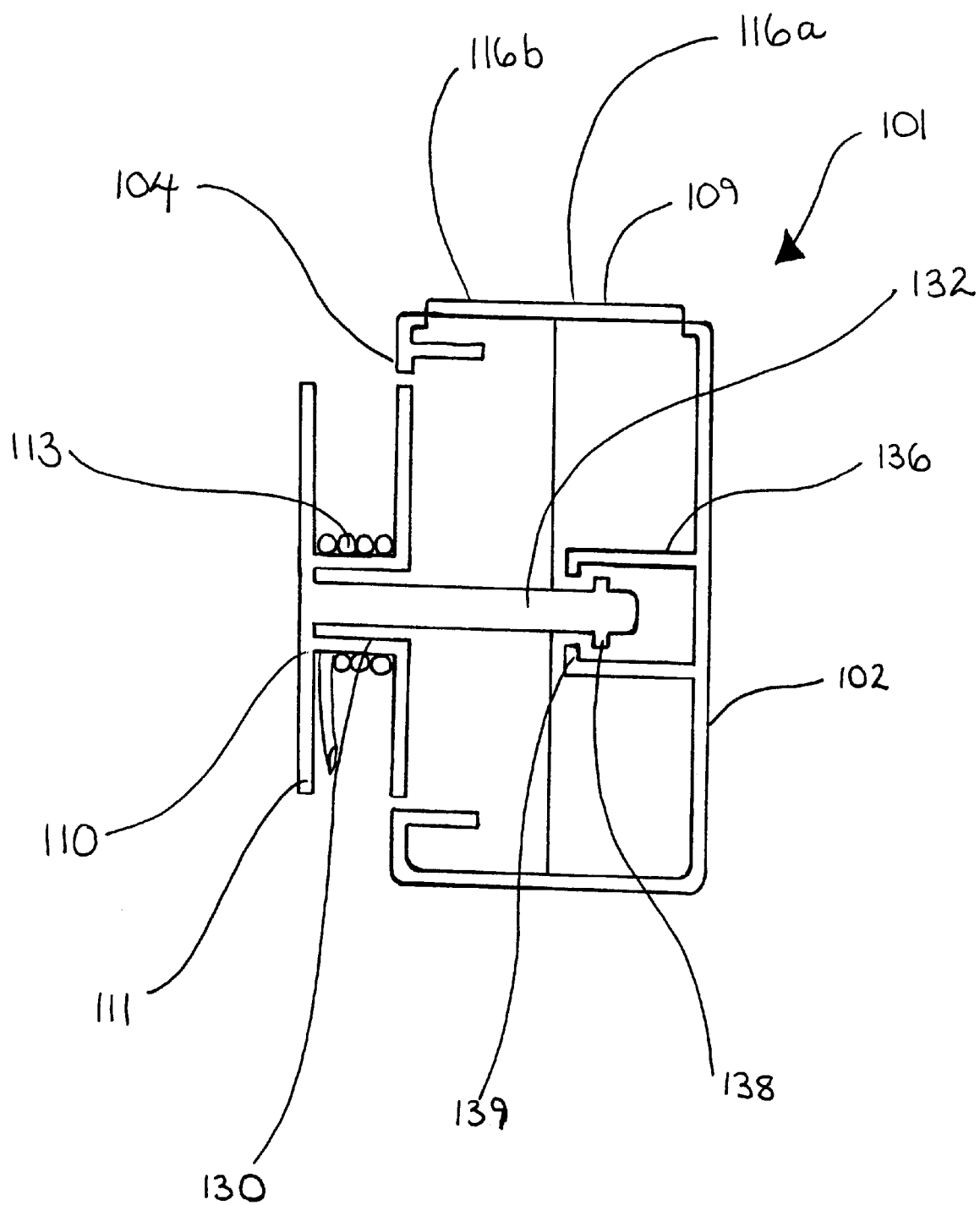
FIG. 5b is a sectional view from the side of the embodiment of FIG. 5a in the open position.

A battery charging unit 1 comprises a casing 2, made of a plastic material in a known manner. The casing 2 has a current supply means provided therein for supplying current to an electrical or electronic apparatus located remote from the battery charging unit 1, coupling means provided on the casing 2 for coupling the current supply means to a mains power supply, means for coupling the remote apparatus to the current supply means, comprising a cable 13, and a reel provided in the casing 2 for storing the cable 13 in the casing 2 when the battery charging unit 1 is not in use, and allowing the cable 13 to be dispensed when required.

Referring to FIGS. 1, 2a and 2b, the casing 2 has teardrop-shaped front and rear faces 3,4 and a continuous side wall 12. In a portion of the side wall 12 are provided a pair of pins 5a,5b adapted to be received into a conventional electrical socket, for example, a wall socket to couple the battery charging unit 1 to a mains power supply. In the embodiment described herein, the pins 5a,5b are those for the US mains supply, but may equally well be of the three-pin type for the UK, or any other known pin arrangement.

In another portion of the side wall 12 there is provided a recess 6 into which may be placed a battery 7 to be recharged. In the interior of the recess 6 are a number of contacts (not visible) for contacting matching contacts (not shown) provided on the battery 7. These contacts are used for supplying current to the battery 7 for recharging, and to monitor the charge state of the battery 7 to ensure optimum charging. The recharging of the battery is carried out in any known manner. For clarity, the electrical couplings and internal circuitry are not illustrated in the drawings. The couplings are achieved by any suitable known means.

A slidable cover 9 is provided to cover the recess 6 to prevent damage to the recess 6, and, in particular, the contacts 8, when the charging unit 1 is not being used to charge a battery in this way.

Referring now to the embodiments shown in FIGS. 3 to 5b, the numerical indicators for corresponding parts from the previous figures are the same numbers preceded by 100. The charging units 101 of these preferred embodiments comprise a non-rotatable reel 110 mounted within the casing 102 and substantially centrally located. The reel 110 comprises a circular drum 130, around which a length of cable 113 is wound. The reel 110 is able to be pulled out of the casing 102 to expose the reel to the outside of the casing to enable the user to manually wind the cable around the drum 130. A perspective view of a battery charging unit 101 in the open position is shown in FIG. 4b, and a sectional view from the side in FIG. 5b. The closed position is shown in FIGS. 4a and 5a. The reel 110 comprises a reel plate 111 which forms part of the rear wall 104 of the casing 102 when the reel 110 is in the closed position. The reel plate 111 comprises an opening means 134 by which the user can grip the reel 110 and pull it out of the casing when it is desired to wind or unwind the cable around the reel. In these embodiments, the opening means comprises two snap-fit tabs 134 on the reel plate 111 which interact with the side wall 112. Other embodiments are possible wherein the opening means 134 is substituted by an alternative opening means. The length of cable 113 terminates at its free end in a plug (not shown), configured to connect with a corresponding socket provided in the housing of a remote portable mobile cellular radio telephone (not shown). The other end is coupled to a transformer/current generator arrangement housed within the casing 102 to couple current from the mains power supply through the pins 5a, 5b to the remote cellular radio telephone. As mentioned above, this coupling can be achieved in any known manner, but is not shown in the figures for clarity. An aperture (not shown) is provided in the side wall 112 through which the cable 113 exits the casing 102. In an alternative embodiment, the aperture is provided in the reel plate 111.

The casing 102 is formed in two halves 116a, 116b from a rigid plastics material. The reel 110, also made from a rigid plastics material, is non-rotatably mounted on one of the halves 116a by a spindle 132. The corresponding casing half 116b has a circular aperture 117 therein which fits around the reel plate 111 when the battery charging unit 101 is assembled so as to form, together with the reel plate 111, the rear face 104.

The spindle 132 is mounted in a spindle housing 136 in which it can be telescopically moved and at the same time maintained in the central position with respect to the casing 102. The spindle 132 and spindle housing 136 do not permit the reel 110 to rotate, in order to enable easy winding of the cable around the reel by a user, which could be problematic were the reel to be rotatable. The spindle 132 and the spindle housing 136 comprise corresponding stop means 138, 139 to stop further movement of the reel 110 when it has been pulled out to a pre-determined extent which is sufficient for the user to wind or unwind the cable 113 around the reel 110.

This corresponding stop means 138, 139 also comprises a cammed detent means (not shown) to resiliently retain the reel 110 in the pulled out position so that the user has his hands free to hold the casing 102 with one hand and wind or unwind the cable 113 around the reel 110 with the other without inadvertently pushing the reel 110 back in the casing 102. When the winding operation is complete the user may press the reel back in the casing 102 with sufficient force to overcome the cammed detent means. The user may unwind the cable to any desired length—either completely unwound or partially unwound—and then press the reel back into the casing, the desired length of cable exiting the casing through the opening, and allowing the casing of the battery charging unit to be arranged in the closed position during use of the battery charging unit. The closed casing can accomodate the plug when the cable is fully wound, giving the advantage that the cable and plug are retained neatly inside the battery charging unit, and are protected when the battery charging unit is not in use.

In use, the charging unit 1 is plugged into the mains supply using the external pins 5a, 5b and the cable plug 14 plugged into the cellular radio telephone housing to charge a battery in situ on the telephone. If required, another spare battery can be placed in the recess 6 for recharging. The process for the recharging of the two batteries is not relevant to the present invention, and is therefore not described in any detail herein.

Figure 6:
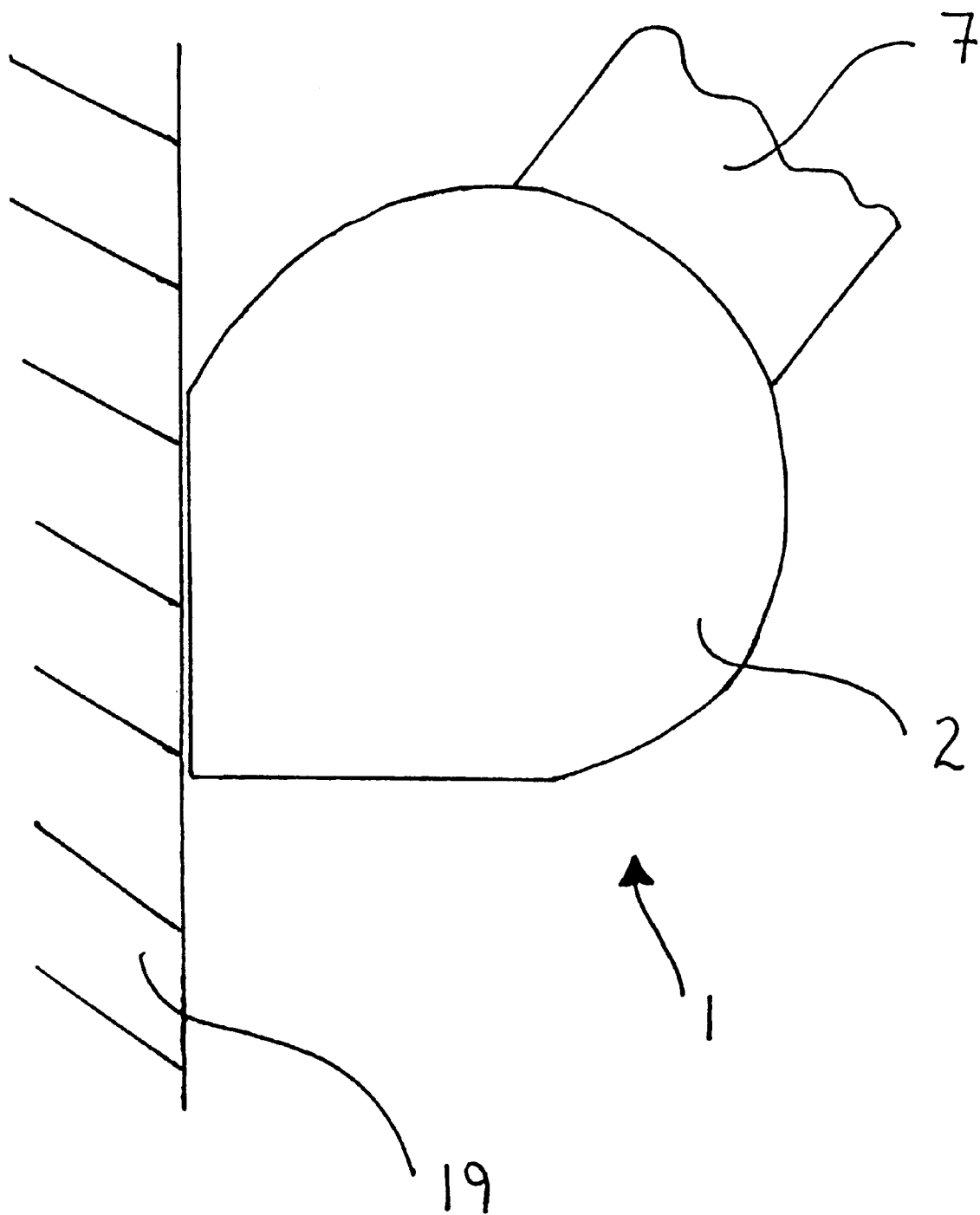
FIG. 6 schematically illustrates the charging unit of FIG. 1 plugged into a wall mounted mains socket with a spare battery in situ.
Figure 7:
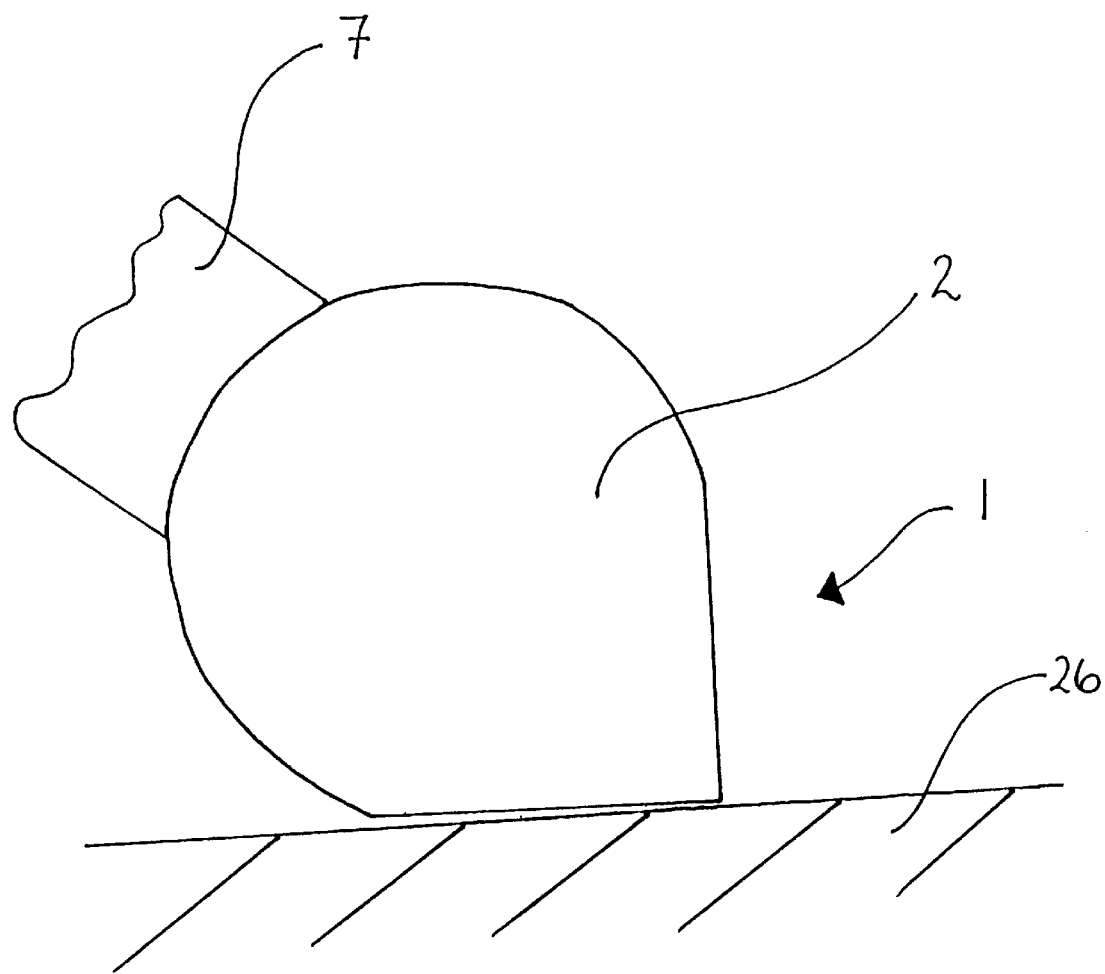
FIG. 7 schematically illustrates the charging unit of FIG. 1 plugged into a floor mounted mains socket with a spare battery in situ.

Referring now to FIGS. 6 and 7, as described above, the battery charging unit 1 is provided with means to recharge a spare battery 7 by placing it in the recess 6. In use, the cover 9 is retracted and the spare battery 7 inserted in the recess 6 so that the contacts contact the matching contacts on the spare battery 7.

The recess 6 is located in the side wall 12 at such a location, and dimensioned such that, when the charging unit 1 is plugged into a socket mounted on a wall 19 as illustrated in FIG. 6, the spare battery 7 is oriented at an acute angle—preferably around 45 degrees—to the vertical so that the battery 7 remains in the recess 6 under gravity and the frictional fit within the recess 6. Similarly, when the charging unit 1 is plugged into a socket mounted on the floor 20, as illustrated in FIG. 7, the battery 7 remains at an acute angle—again preferably around 45 degrees—to the vertical, and, therefore, also remains in the recess.

Figure 8:
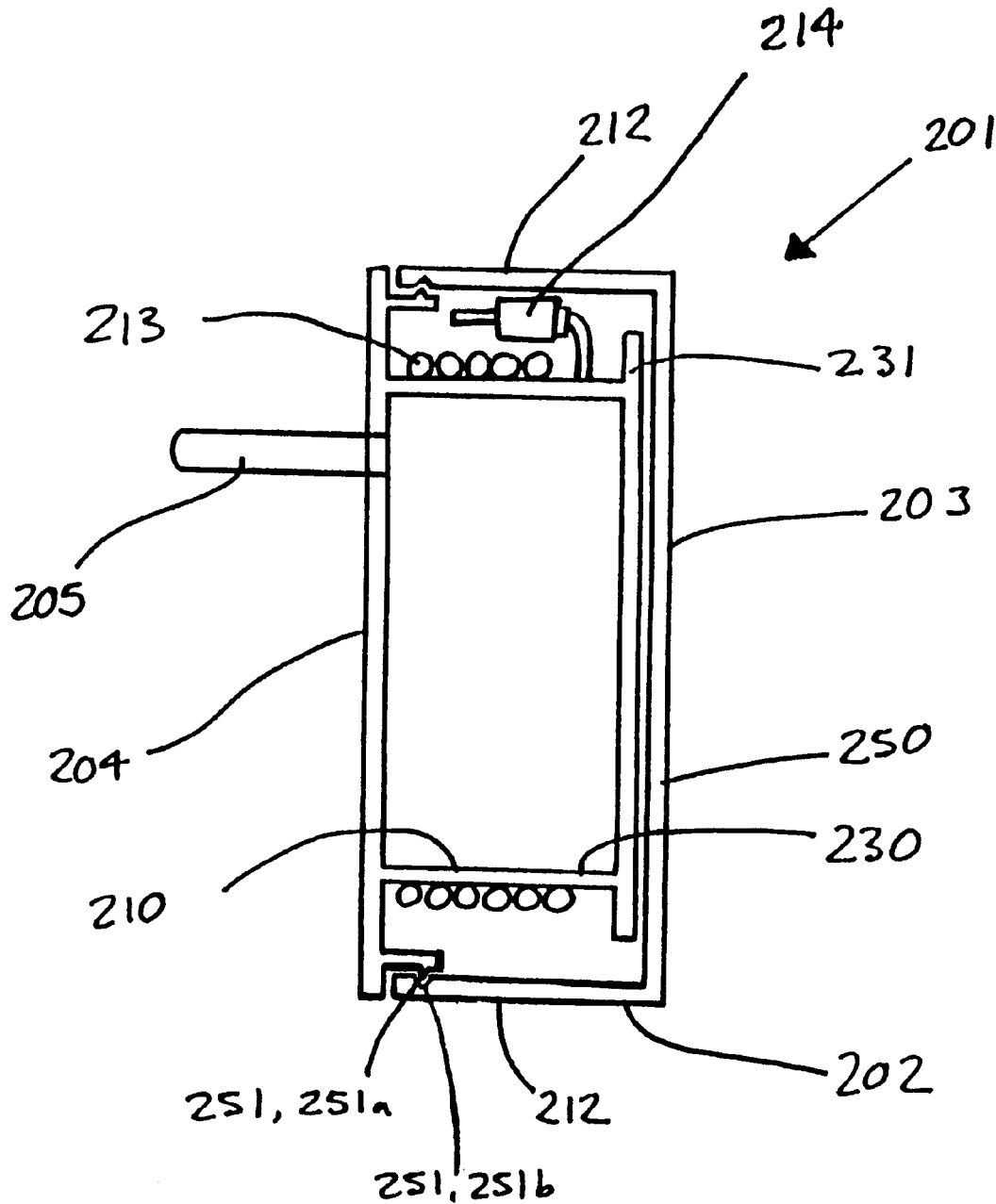
FIG. 8 is a cross-sectional view from the side of a further preferred embodiment of a battery charging unit according to the present invention.

Referring now to the embodiment shown in FIG. 8, this shows a battery charging unit 201 which is rectangular and shaped more like a standard plug or plug adapter unit, having a casing 202 comprising a front face 203, a rear face 204 and four side faces 212. In this embodiment, a pair of pins 205 are provided, as described in relation to the first embodiment of a battery charging unit, but in this embodiment these are provided on the rear face 204 of the battery charging unit.

The front face 203 and four side faces 212 together comprise a cover 250 which is releasably attachable to the rear face 204 by cover attaching means, comprising a snap-fit lip 251a formed as part of the rear face 204, and groove 251b formed in the side walls 212. The cover is detachable by a user to reveal a non-rotatable reel 210 enclosed by the casing 202, permanently fixed to the rear face 204 and substantially centrally located. The reel 210 comprises a hollow circular drum 230, around which a length of cable 213 is wound, and a front plate 231 which maintains the cable on the reel 210. The cable terminates at its free end in a plug 214, which is storable within the casing 202 when not in use. The transformer/current generator components of the battery charging unit are arranged under the reel 210, within the hollow drum 230. An aperture (not shown) is provided in the cover 250, in order that the cover 250 may be replaced over the reel when the cable is partially or fully unwound.

To use the battery charging unit 210, a user is first required to remove said cover 250 to access said cable 213 wound on said reel 210. The required length of cable 213 is then unwound by the user, the cover replaced and the battery charging unit 210 used as previously described. When not in use, the length of cable 213 is manually wound around the reel 210 by the user, and the cover 250 replaced by the user.

Figure 10A:
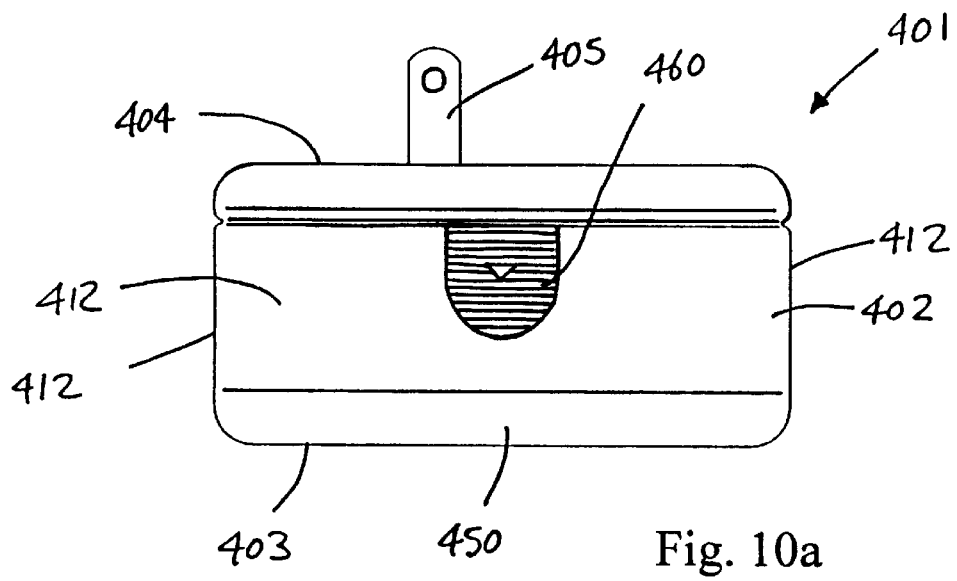
FIG. 10a is a side view of a further embodiment of a battery charging unit according to the present invention, in the closed position.
Figure 10B:
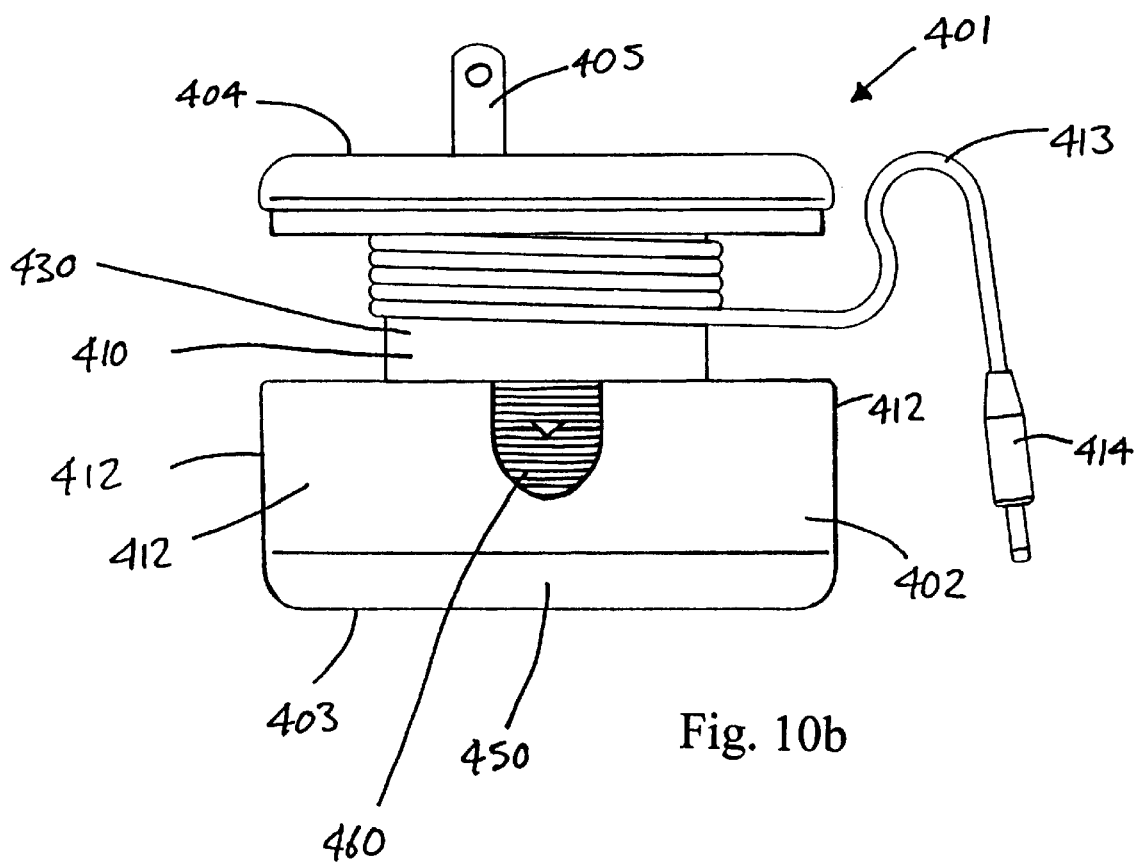
FIG. 10b is a side view of a further embodiment of a battery charging unit according to the present invention, in the open position.
Figure 11:
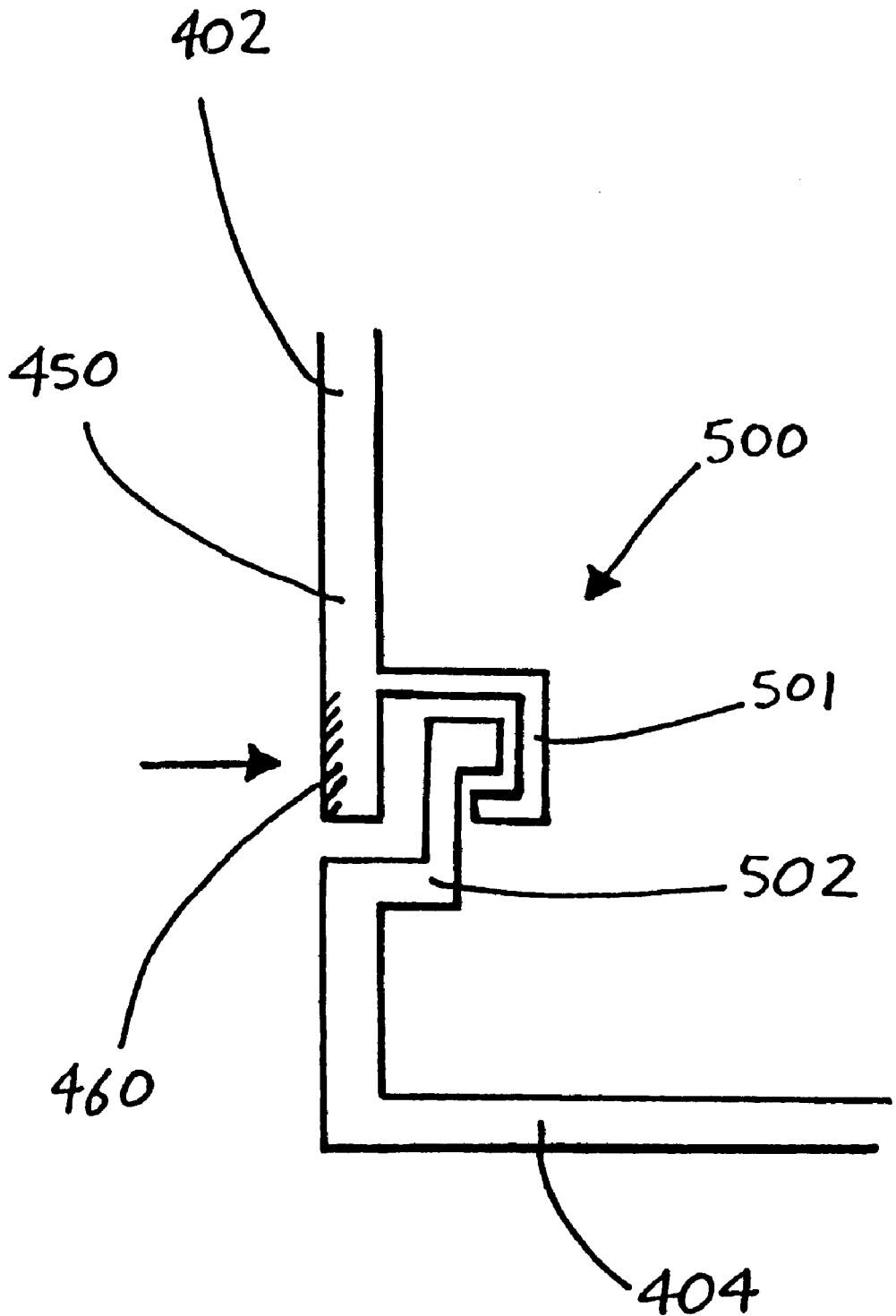
FIG. 11 is a cross-sectional side view, in enlarged scale, of the press-release locking means of the embodiment of FIGS. 10a and 10b.

In similar embodiments, the cover attaching means alternatively or additionally comprises a locking means, such as a press-release locking means similar to that shown in FIG. 11 and described in detail in relation to the embodiments of FIGS. 10a and 10b. This allows the battery charging unit 201 to be pulled out of the wall by a user without the cover 250 accidentally being detached. Thus, to detach the cover 250, a user must first disengage the press-release mechanism.

In a further variation, the embodiment of FIG. 8 is made in a cylindrical shape, said casing 202 comprising a front face, a rear face and a single continuous side wall.

Figure 9:
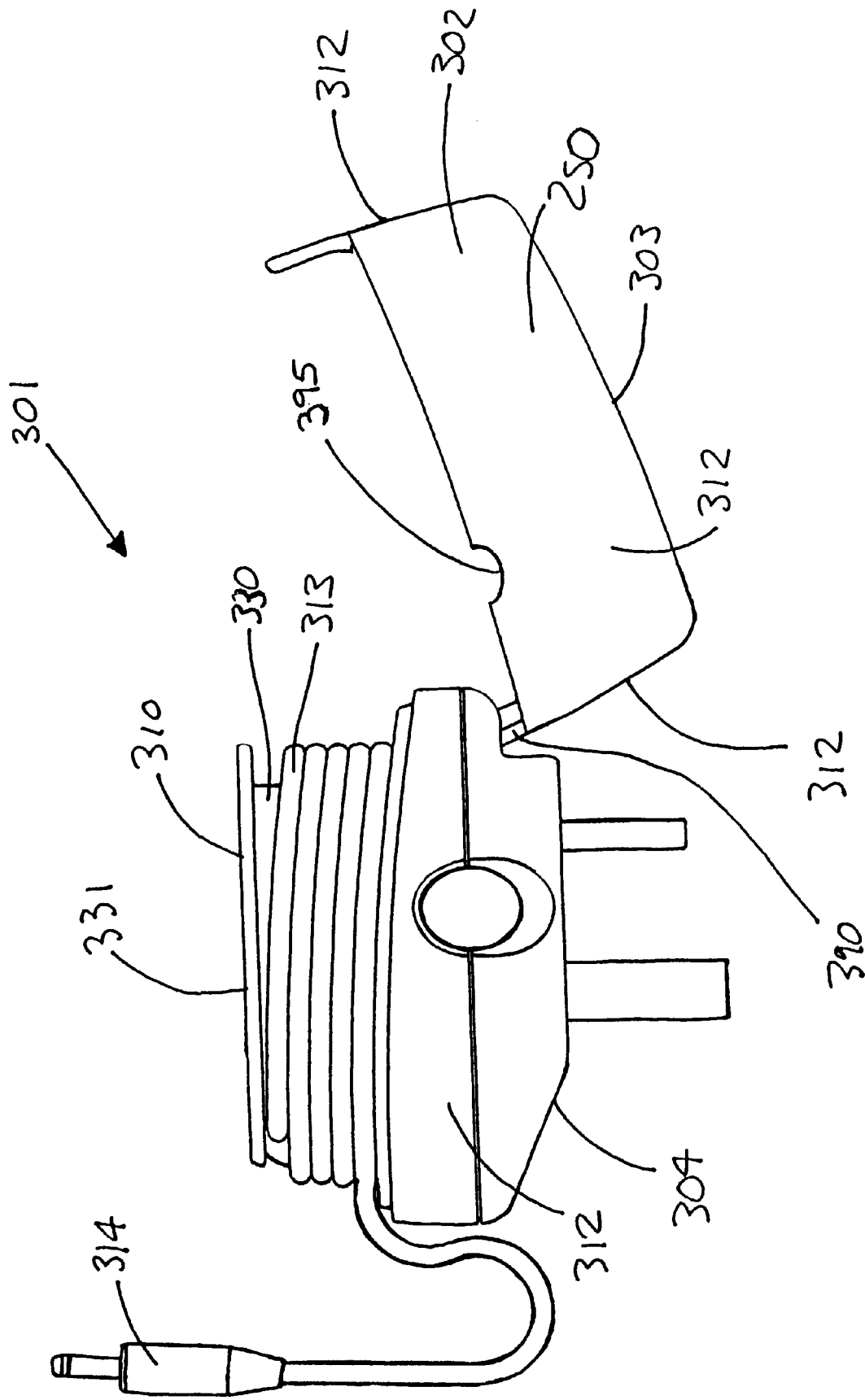
FIG. 9 is a side view of a further preferred embodiment of a battery charging unit according to the present invention in the open position.

Referring now to FIG. 9, this shows a third preferred embodiment of a battery charging unit 301, in which the cover 350 is permanently attached to said rear face 304 by means of a hinge 390, and the cover 350 is therefore openable by a user to reveal the reel 310 thereunder. This embodiment is similar to that of FIG. 8, and corresponding numerical identifiers have been used, prefixing them with 300 in FIG. 9, as opposed to 200 in FIG. 8. Note that in this embodiment, the aperture 395 in the cover 350, through which the cable 313 may exit the casing 302, is visible.

Referring now to FIGs. 10a and 10b, these show a further embodiment of a battery charging unit 401, which is similar to the embodiment shown in FIG. 8, and similarly shaped. Corresponding numerical identifiers have been used to label corresponding parts in FIGS. 8 and 10a and 10b, those of FIGS. 10a and 10b being preceded by 400. However, this embodiment differs to the embodiment of FIG. 8 in that the cover 450 is permanently attached to said battery charging unit 401, and is slidable between a closed position, shown in FIG. 10a, and an open position, shown in FIG. 10b, in which the cover 450 is moved away from the rear face 404 and the reel 410 is revealed thereunder. The reel 410 is non-rotatable as in the embodiment of FIG. 8, and the transformer/current generator components of the battery charging unit are arranged under the reel 410, within the hollow drum 430. In this embodiment, the plug 414 at the free end of the cable 413 fits under the closed cover 450 when the battery charging unit 401 is not in use. An aperture is provided in the cover, (not shown), through which the cable exits the battery charging unit in order that the cover 450 may be placed in the closed position when the desired length of cable has been unwound, allowing the battery charging unit to be used, whilst the cover is closed.

To retain the cover 450 in the closed position, when the battery charging unit is not in use, the cover 450 is provided with press-release locking means 500, which are shown in FIG. 11, and finger grips 460 which are pressed inwards, (in the direction shown by the arrow in FIG. 11), by a user to disengage said press-release locking means. The press-release locking means 500 comprise a first locking section 501 formed on the cover 450, which co-operates with a second locking section 502 formed as part of the rear face 404. When the cover 450 is moved towards the rear face 404 into the closed position, the co-operating first and second locking sections 501, 502 engage, locking together as shown in FIG. 11 to retain the cover 450 in the closed position. To disengage the first and second locking sections 501, 502 from one another and thus to release the cover 450 in order that it may be moved into the open position, a user pushes on the finger grips 460. This action moves the first and second locking sections 501, 502 out of co-operation and allows them to disengage.

As previously mentioned, the above-described locking means 500 may be incorporated into the embodiment shown in FIG. 8, to give the advantage that the cover 250 is not accidentally removed by a user when the user attempts to remove the battery charging unit 201 from a wall socket.

As will be understood to a person skilled in the art, various modifications are possible within the scope of the present invention. For example, other shapes of battery charging unit are possible. The pin arrangement can be selected to correspond with the plug and socket convention of the region where the unit is to be used. Similarly, the recess of those embodiments incorporating a recess for a battery is dimensioned to receive the appropriate battery. The recess can also be dimensioned to receive the whole telephone rather than simply the battery. The battery charger can be used to recharge batteries for other electrical or electronic apparatus, for example a portable personal computer.

I claim:

1. A battery charging unit comprising a housing having a current supply means provided therein for supplying current to an electrical or electronic apparatus located remote from the battery charging unit, coupling means provided on the housing for coupling the current supply means to a mains power supply, means for coupling the remote apparatus to the current supply means, comprising a cable, and a reel provided in the housing for storing the cable in the housing when the battery charging unit is not in use, but allowing the cable to be dispensed when required, wherein said reel is mounted within the housing and is able to be disengaged with respect to the housing to enable the user to manually wind the cable around the reel.

2. A battery charging unit according to claim 1, wherein the reel includes a reel plate which defines part of the wall of the housing.

3. A battery charging unit according to claim 1, wherein the reel includes a reel plate which comprises an opening means by which user can grip the reel and pull it out of the housing when it is desired to wind or unwind the cable around the reel.

4. A battery charging unit according to claim 1, characterized in that the cable exits the housing through an aperture in the housing.

5. A battery charging unit according to claim 2, characterized in that the cable exits the housing through an aperture in the reel plate.

6. A battery charging unit according to claim 5, characterized in that the aperture allows the reel to be pushed into the housing when the cable is unwound.

7. A battery charging unit according to claim 1, characterized in that the reel comprises a spindle mounted in a spindle housing in which it can be telescopically moved and at the same time maintained in the central position with respect to the housing.

8. A battery charging unit according to claim 7, characterized in that the spindle and the spindle housing comprise corresponding stop means to stop further movement of the reel and a cammed detent means to resiliently retain the reel in the pulled out position.

9. A battery charging unit according to claim 8, characterized in that the detent means provide sufficient retaining force on the reel so that the user has his hands free to hold the housing with one hand and wind or unwind the cable around the reel with the other without inadvertently pushing the reel back in the casing and yet low enough that when the winding operation is complete the user may press the reel back in the housing with sufficient force to overcome the cammed detent means.

10. A battery charging unit according to claim 1, characterized in that part of said housing comprises a cover which is openable to provide access to the reel and closeable to cover the reel.

11. A battery charging unit according to claim 10, characterized in that said cover is releasably attachable to said housing.

12. A battery charging unit according to claim 10, characterized in that said cover is pivotally attached to said housing.

13. A battery charging unit according to claim 10, chlaracterised in that said cover is slidably attached to said housing.

14. A battery charging unit according to claim 10, characterized in that said cover is provided with releasable locking means to retain the cover in the closed position.

15. A battery charging unit according to claim 12, characterized in that said locking means comprise a press-release locking means.

16. A battery charging unit according to claim 1, characterized in that said battery charging unit also comprises means for mounting a battery within the housing such that current is supplied from the current supply means to the battery mounted therein, the battery mounting means being provided such that the battery is mounted at an orientation whereby the longitudinal axis of the battery is at an acute angle to the horizontal and vertical axes of the housing.

17. A battery charging unit according to claim 16, wherein the acute angle is approximately 45 degrees.

18. A battery charging unit according to claim 16, wherein the battery to be mounted within the housing is part of an electrical or electronic apparatus, the whole apparatus being receivable in the recess.

* * * * *